US005422637A

United States Patent [19]

Sezai

[11] Patent Number: 5,422,637

[45] Date of Patent: Jun. 6, 1995

[54] METHOD OF PERFORMING BEAM COMPRESSION PROCESS ON ANTENNA PATTERN OF RADAR

[75] Inventor: Toshihiro Sezai, Tokyo, Japan

[73] Assignee: National Space Development Agency of Japan, Tokyo, Japan

[21] Appl. No.: 217,064

[22] Filed: Mar. 14, 1994

[30] Foreign Application Priority Data

May 10, 1993 [JP] Japan .................................. 5-131035
Nov. 8, 1993 [JP] Japan .................................. 5-300797

[51] Int. Cl.[6] ................................................ H04B 7/00
[52] U.S. Cl. ........................................ 342/13; 342/382
[58] Field of Search ............................ 342/13, 378–384

[56] References Cited

U.S. PATENT DOCUMENTS 4,075,633 2/1978 Lewis ........................... 343/100 LE
4,298,872 11/1981 Rodgers ........................ 343/100 LE
4,628,321 12/1986 Martin ................................. 342/319
5,021,793 6/1991 Stangel et al. ...................... 342/383

*Primary Examiner*—Mark Hellner
*Attorney, Agent, or Firm*—Armstrong, Westerman, Hattori, McLeland & Naughton

[57] ABSTRACT

An antenna system comprises a main antenna for use of transmission and reception and a dedicated sub-antenna for use of reception. The antenna beam of the antenna system is scanned in the direction of a beam width to be compressed. Both received signals of the main antenna and the sub-antenna are fed to a signal processing circuit and a multiplying circuit, and converted to power signals and then multiplied each other. In this processing, only if the cosine value corresponding to the phase difference between the received power signals of the main antenna and the sub-antenna is positive, the multiplication between the received power signals is carried out and the result is further multiplied by the cosine value, and then the obtained signal is output as a final output signal.

6 Claims, 7 Drawing Sheets

METHOD OF PERFORMING BEAM COMPRESSION PROCESS ON ANTENNA PATTERN OF RADAR

BACKGROUND OF THE INVENTION

1. Field of the Invention

The present invention relates to a method of performing beam compression of an antenna pattern, which can provide better performance in the beam compression process of an antenna pattern of a radar utilizing the multiplicative array principle.

2. Description of the Related Art

In general, a beam width is one of indexes representing the performance of an antenna pattern of a receiving antenna or other type antennas. A narrower beam width of an antenna pattern will give a better performance. However, there is a relationship of inverse proportion between a beam width and the size (length) of an antenna. Therefore, if the beam width is reduced, then the size of the antenna will be increased. Conversely, if the dimension of the antenna is reduced, then the beam width will be broadened.

For example, in an antenna for a radar system, if it is desired to double the ability or the resolution to discriminate objects, it is required to halve the beam width and thus it is required to double the size of the antenna. The doubling of the size leads to not only a larger occupied region but also various disadvantages such as an increase in the weight of the antenna and in the size of a structure for supporting the antenna. Conversely, if the size of an antenna is halved, then the beam width will be doubled and the discrimination ability will be degraded by a factor of two.

It is well known that there is such a conflicting relationship between a beam width and the size of an antenna. In most cases, an actual antenna has a limitation in the region it can occupy. Therefore, under these limited conditions, a certain degree of compromise associated with the beam width has to be made.

One known beam compression technique to alleviate the above-described problems is to reduce the beam width by means of multiplication of received signals of a plurality of antennas according to the multiplicative array principle. FIG. 1 is a schematic diagram illustrating a configuration of a radar system which can perform the beam compression in such a manner described above. In this figure, reference numeral 101 designates a main antenna such as an array antenna comprising a plurality of radiation elements which are equally spaced along a straight line. Reference numeral 102 designates a sub-antenna disposed apart from the main antenna 101 in the X-direction which is the direction of a beam-width to be reduced. Reference numeral 103 designates a transmission circuit which generates transmission power, which is in turn fed to the main antenna 101. Reference numeral 104 designates a multiplying circuit which performs multiplication between a received electric field signal received by the main antenna 101 and a received electric field signal received by the sub-antenna 102. Reference numeral 105 designates a rectifying circuit which provides an output signal only when the multiplied output signal from the multiplying circuit 104 is positive. In FIG. 1, the beam-axis direction is perpendicular to the X-Y plane or the plane of the drawing.

In the antenna system having such a configuration described above, electric field signals received by the respective antennas 101 and 102 are fed in the same phase to the multiplying circuit 104 so as to perform the multiplication on these signals. The multiplied signal is output via the rectifying circuit 105 only if the multiplication result is positive. As a result, a received electric field signal (electric field pattern) corresponding to the directional characteristic of the main antenna 101 such as that shown in FIG. 2 is multiplied by a received electric field signal (electric field pattern) corresponding to the directional characteristic of the sub-antenna 102 such as that shown in FIG. 3, thus providing an output signal (output pattern), such as that shown in FIG. 4, corresponding to the synthetic directional characteristic having a beam width $\theta wc$ which is reduced from the beam width $\theta w$ of the electric field pattern associated with the main antenna.

In the beam compression method of an antenna pattern according to the conventional technique based on the above-described multiplicative array principle, there is a problem that it is impossible, as a matter of course, to achieve a resolution better than that corresponding to the beam width $\theta wc$ of synthetic directional characteristic, shown in FIG. 4, obtained by performing the multiplication process on the received electric field signals.

SUMMARY OF THE INVENTION

It is an object of the present invention to improve the above-described problem in the conventional technique of beam width compression of an antenna pattern. More specifically, it is an object of the present invention to provide a method for compressing the beam width of an antenna pattern of a radar antenna, which can perform more effective compression of the beam width, whereby the distinguishing ability can be improved.

To solve the foregoing problem, the present invention provides a method for compressing the beam width of the antenna pattern, comprising the steps of: providing an antenna system comprising a main antenna for transmitting and receiving radio waves and one or more dedicated receiving sub-antennas which are disposed at a location adjacent to the main antenna in the direction of the beam width to be compressed of the main antenna such that the directions of the beam axes of the sub-antennas coincide with the direction of the beam axis of the main antenna; scanning the antenna beam of the antenna system in the direction of the beam width to be compressed, and receiving by the main antenna and sub-antenna the radio wave which was transmitted by the main antenna and reflected by a scattering object and has finally come back; converting the respective received signals received by the main antenna and the sub-antenna to power signals; calculating a cosine value corresponding to the phase difference between the respective received power signals; and providing a final output signal which is a signal obtained by performing multiplication between each received power signal and further multiplying the resulting value by the cosine value, only if the above-described cosine value is positive.

In general, the power signal received by an antenna can be represented by the square of the received antenna electric field signal. If the received power pattern is compared to the received electric field pattern, the received power pattern has a less spread pattern, that is, the received power pattern has a narrower beam width than the received electric field pattern. Therefore, if the multiplication is performed between the received power signal associated with the main antenna and the received power signal associated with the sub-antenna rather than between the received electric field signal associated with the main antenna and the received electric field signal associated with the sub-antenna as in the case of the conventional technique, then it is possible to achieve a narrower beam width as shown in FIGS. 5–7, whereby the resolution can be improved. FIGS. 5 and 6 show received power signals corresponding to the directional characteristics of the main antenna and the sub-antenna, respectively, as in FIGS. 2 and 3. FIG. 7 shows a final output signal (output pattern) obtained by performing the multiplication between the received power signals shown in FIGS. 5 and 6, which is output only if the cosine value is positive.

DESCRIPTION OF THE PREFERRED EMBODIMENTS

Figure 8:
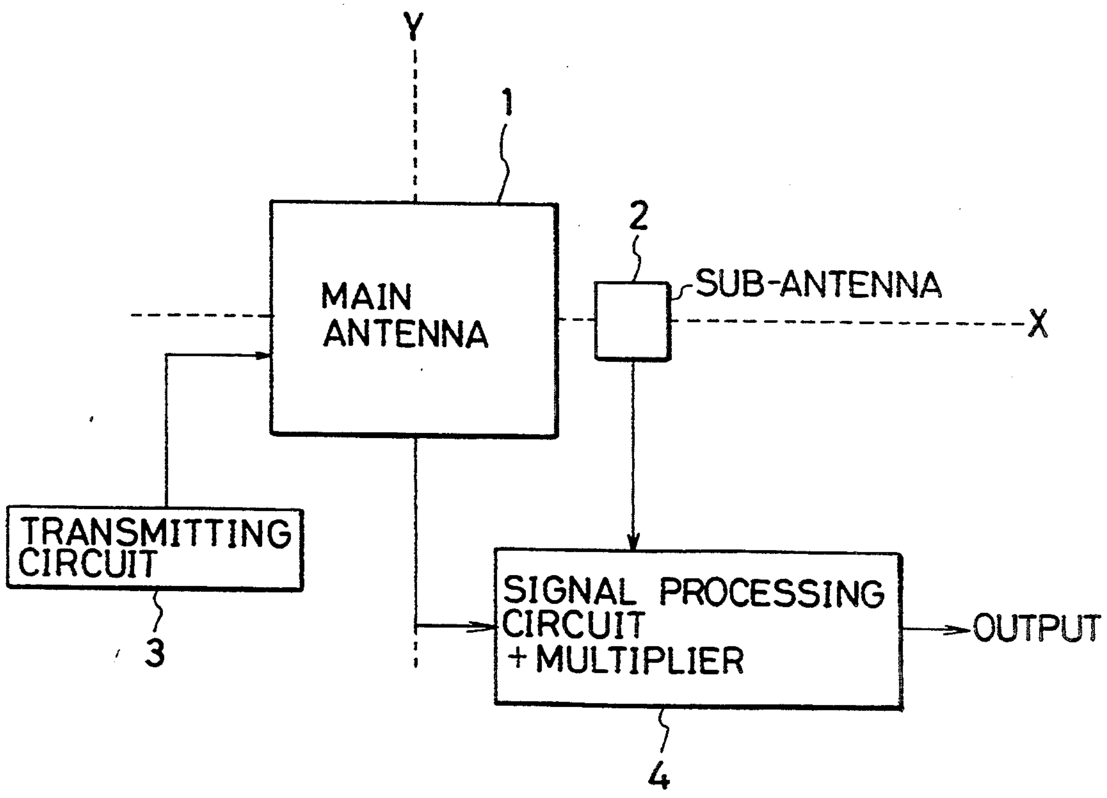
FIG. 8 is a schematic diagram showing a configuration of a radar system, for use of explanation on an embodiment of a method of performing beam compression of an antenna pattern according to the present invention.

Now, referring to an embodiment, the present invention will be described in more detail below. FIG. 8 is a simplified diagram showing a configuration of a radar system for use of explanation on a method of beam compression in the antenna pattern of a radar system according to one embodiment of the present invention. In FIG. 8, reference numeral 1 designates a main antenna for transmitting and receiving radio waves, which have a structure such as a horn antenna or an array antenna. Reference numeral 2 designates a dedicated receiving sub-antenna having a structure such as a dipole antenna, array antenna, or an antenna of any other arbitrary type. This sub-antenna 2 is disposed at a location adjacent to the main antenna 1 in the direction of the beam width to be compressed of the main antenna (in the X-direction) such that the direction of the beam axis of the sub-antenna 2 coincides with the direction of the beam axis of the main antenna 1 (in the direction perpendicular to the X-Y plane). Reference numeral 3 designates a transmission circuit which generates transmission power. The transmission power is fed to the main antenna 1, and transmitted by the main antenna 1. Reference numeral 4 designates a signal processing circuit and a multiplying circuit, to which received electric field signals of the main antenna 1 and the sub-antenna 2 are fed. Here, both received electric field signals are converted to power signals, and thus an amplitude and a phase of the received power of the main antenna 1, and an amplitude and a phase of the received power of the sub-antenna 2 are produced. Then, a cosine value corresponding to the difference between the respective phases is calculated. Only if the cosine value is positive, multiplication between the amplitudes of respective received powers is performed, and the multiplication result is further multiplied by the cosine value corresponding to the phase difference, and then finally the resultant value is provided as an output.

In this radar system configured in the above-described manner, a radio wave is transmitted by the main antenna while scanning the antenna beam. When the transmitted radio wave has come back after being reflected by a scattering object, the main antenna 1 and the sub-antenna 2 output received electric field signals corresponding to their respective patterns. These received electric field signals are fed to the signal processing circuit and the multiplying circuit 4, and converted to power signals and further subjected to the signal processing and the multiplication processing. The resulting output signal is provided as a final output signal having a beam width which is compressed more effectively. In the above-described embodiment, the condition that the cosine value should satisfy is set such as that the cosine value should be positive. However, the condition for the cosine value may also be such that the cosine value should be greater than a predetermined value which is greater than 0 and less than 1, which will lead to an output having more effective beam compression.

Figure 1:
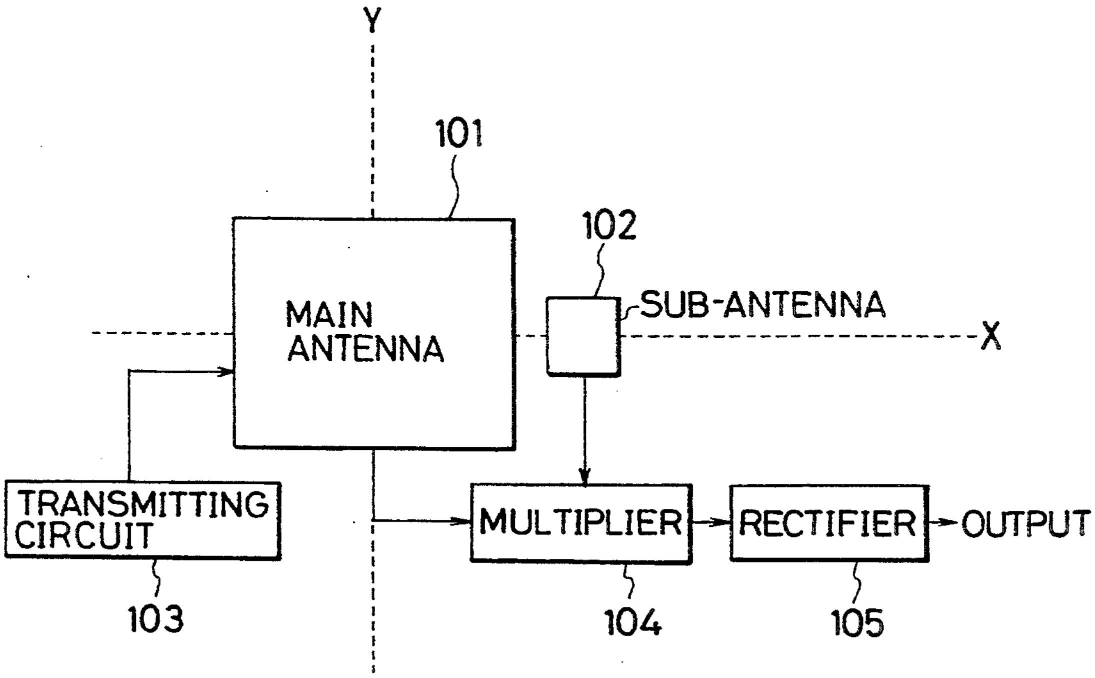
FIG. 1 PRIOR ART
FIG. 1 is a schematic diagram showing a configuration of a conventional radar antenna system according to the multiplicative array principle.
Figure 2:
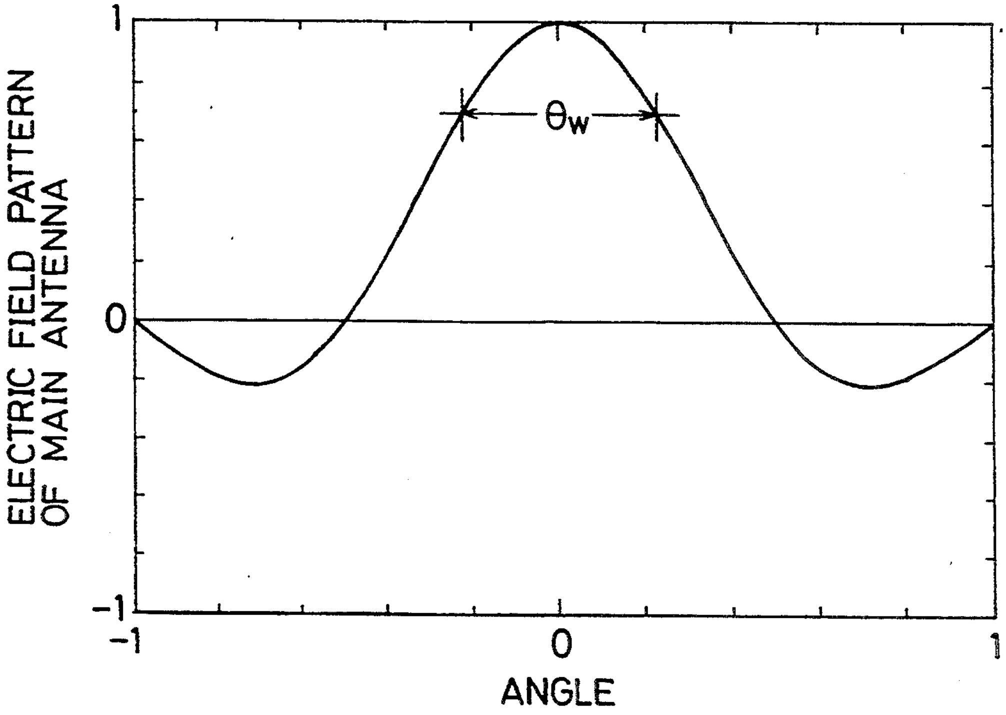
FIG. 2 PRIOR ART
FIG. 2 is a schematic representation of a received electric field pattern associated with a main antenna of the conventional radar antenna system which performs beam compression.
Figure 3:
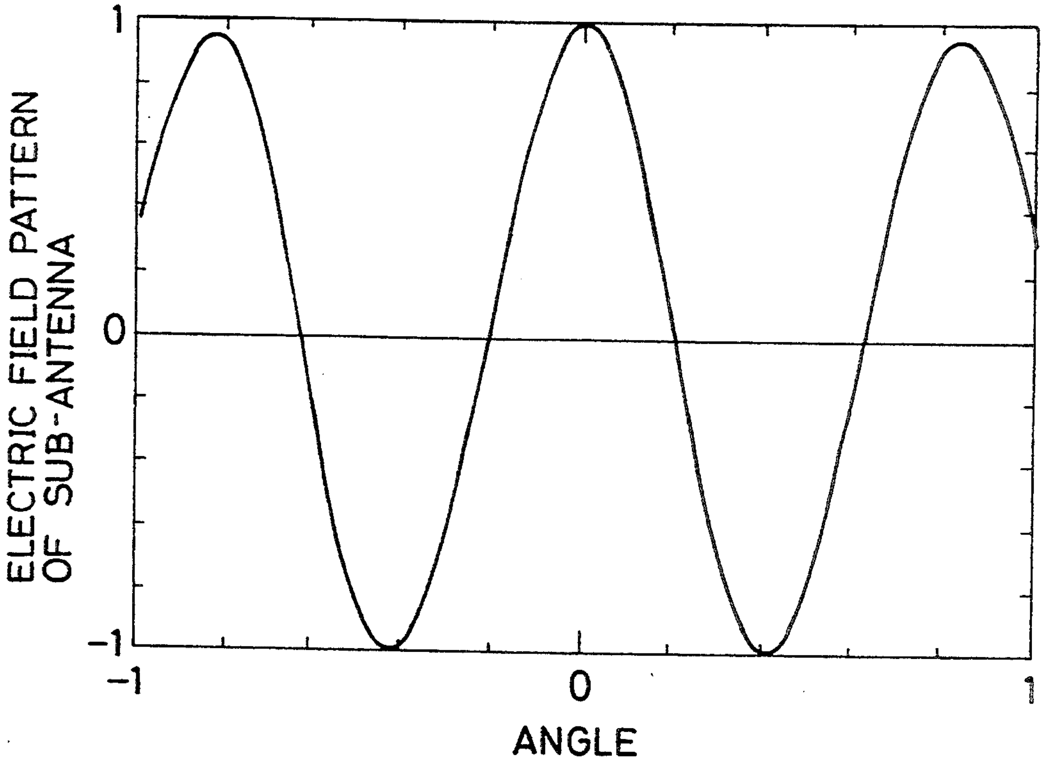
FIG.3 PRIOR ART
FIG. 3 is a schematic representation of a received electric field pattern associated with a sub-antenna of the conventional radar antenna system which performs beam compression.
Figure 4:
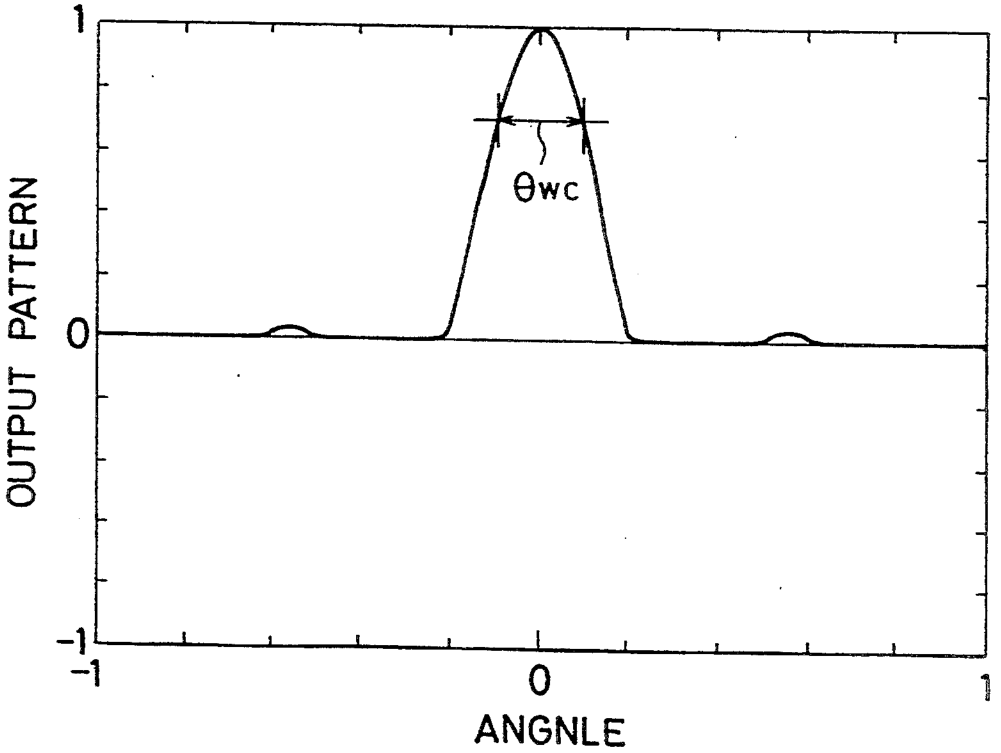
FIG.4 PRIOR ART
FIG. 4 is a schematic representation of an output signal pattern obtained after beam compression is performed by the conventional radar antenna system.
Figure 5:
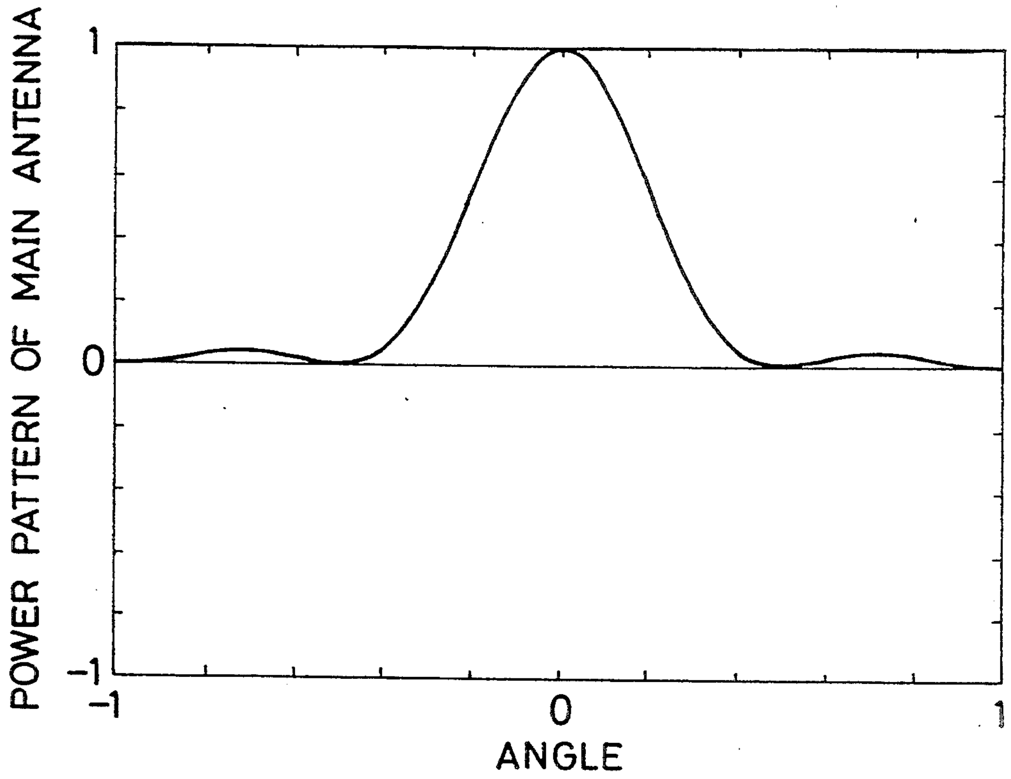
FIG. 5 is a schematic representation of a power pattern associated with a main antenna which is obtained from a received signal of the main antenna according to a method of the present invention for performing beam compression of an antenna pattern of a radar system.
Figure 6:
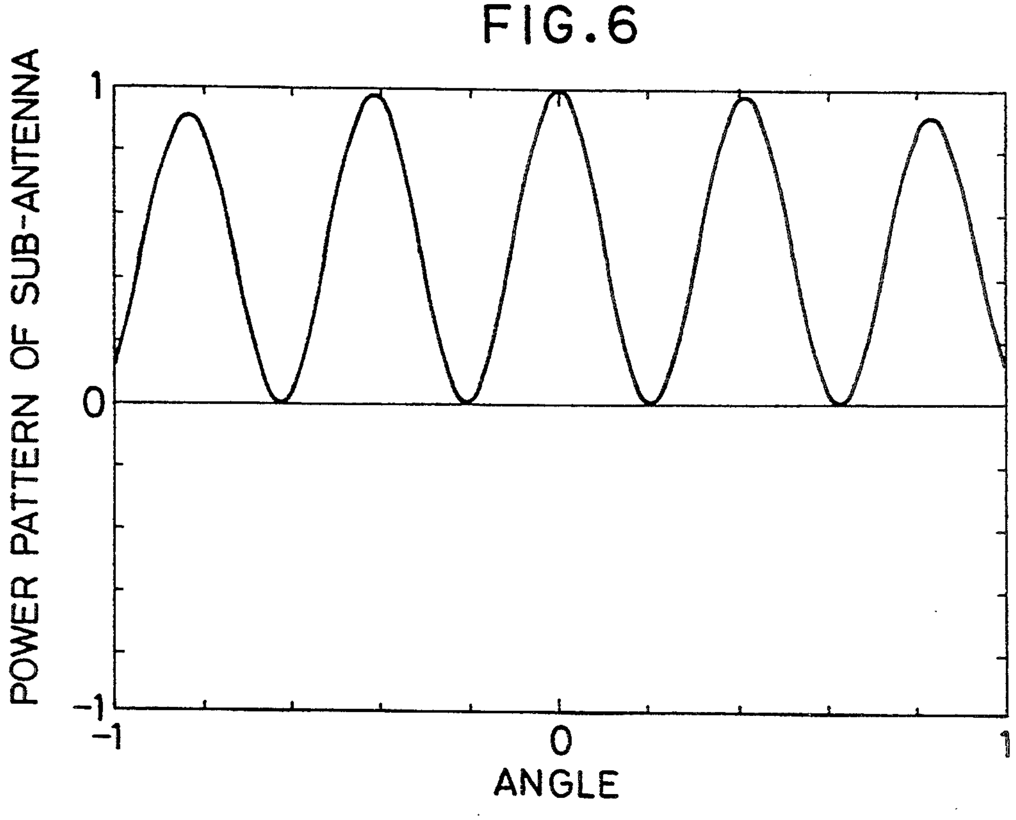
FIG. 6 is a schematic representation of a power pattern associated with a sub-antenna which is obtained from a received signal of the sub-antenna according to the method of the present invention for performing beam compression of an antenna pattern of a radar system.
Figure 7:
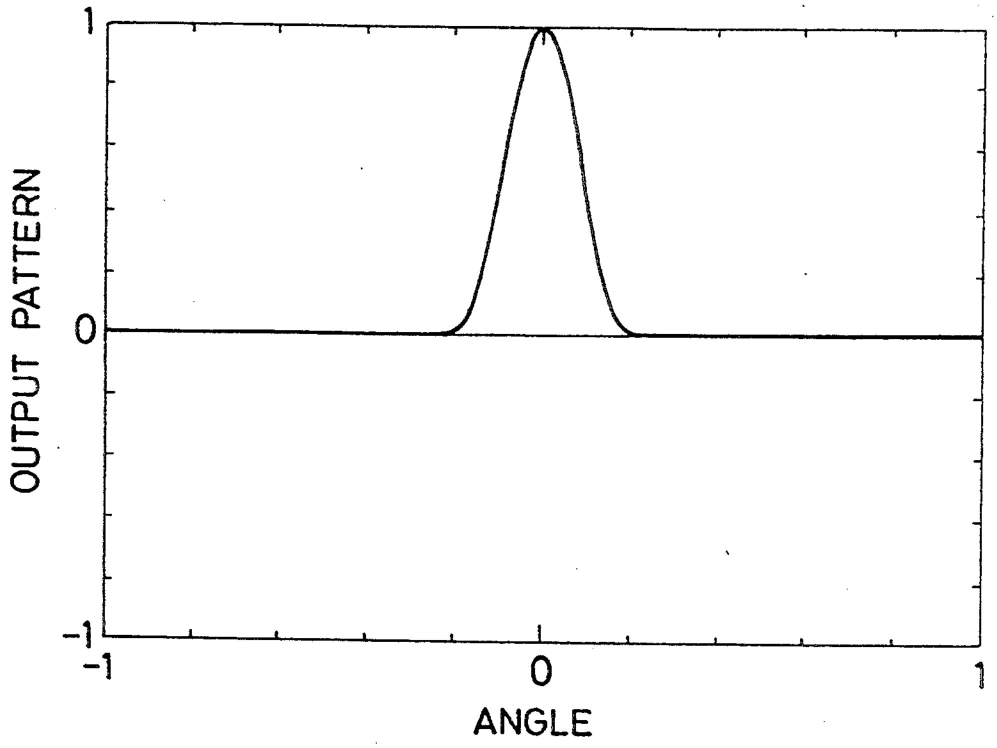
FIG. 7 is a schematic representation of a pattern of an output signal which is obtained after beam compression is performed according to the method of the present invention for performing beam compression of an antenna pattern of a radar system.
Figure 9:
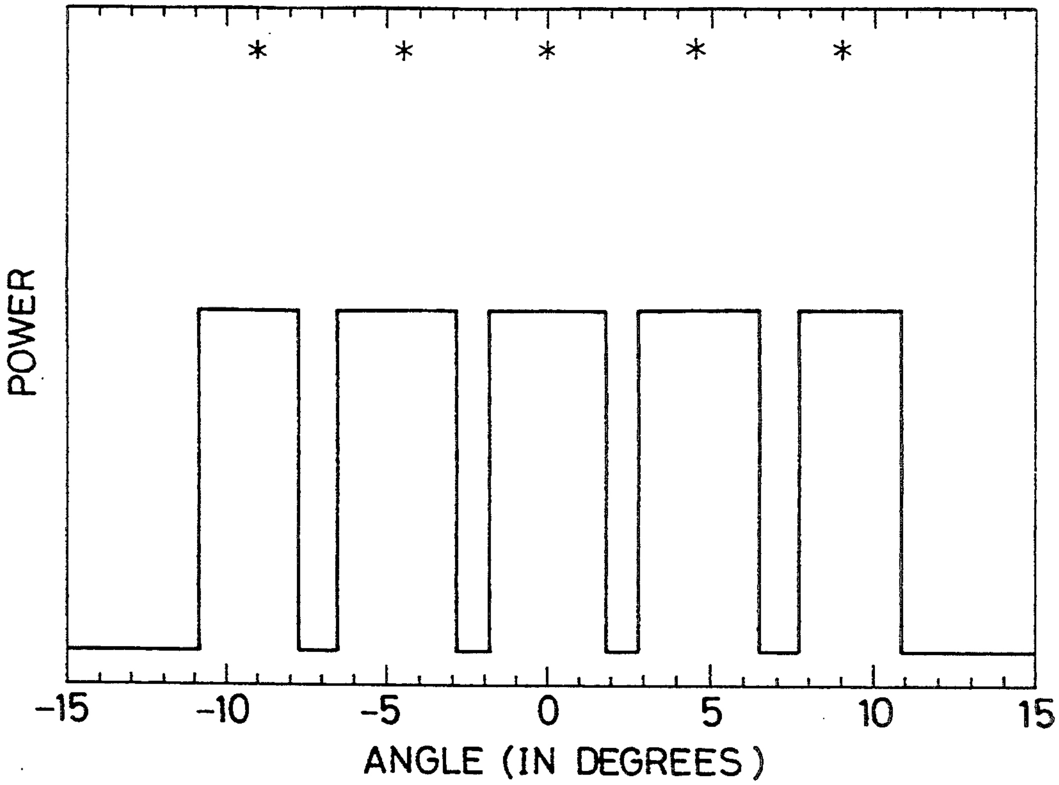
FIG. 9 is a schematic representation of an output power pattern obtained as a result of simulation on the radar system shown in FIG. 8.

FIG. 9 shows a result of simulation on the radar system shown in FIG. 8 wherein the simulation was done assuming that the main antenna is configured with uniformly distributed rectangular antenna whose antenna length in the scanning direction is ten times the wavelength of the radio wave, and the sub-antenna is configured with uniformly distributed rectangular antennas whose antenna length in the scanning direction is one time the wavelength of the radio wave. This simulation result shows the final output power pattern obtained under the condition that there are point scattering objects, which are electromagnetically equivalent to each other, in the directions of +9°, +4.5°, 0°, −4.5°, and −9° about the rotation axis of the antenna system wherein all the scattering objects exist at the same distance from the antenna system. For comparison to the beam compression method according to the present invention, FIG. 10 shows a simulation result of a final output power pattern for the radar system shown in FIG. 1 using a conventional method of beam compression.

Figure 10:
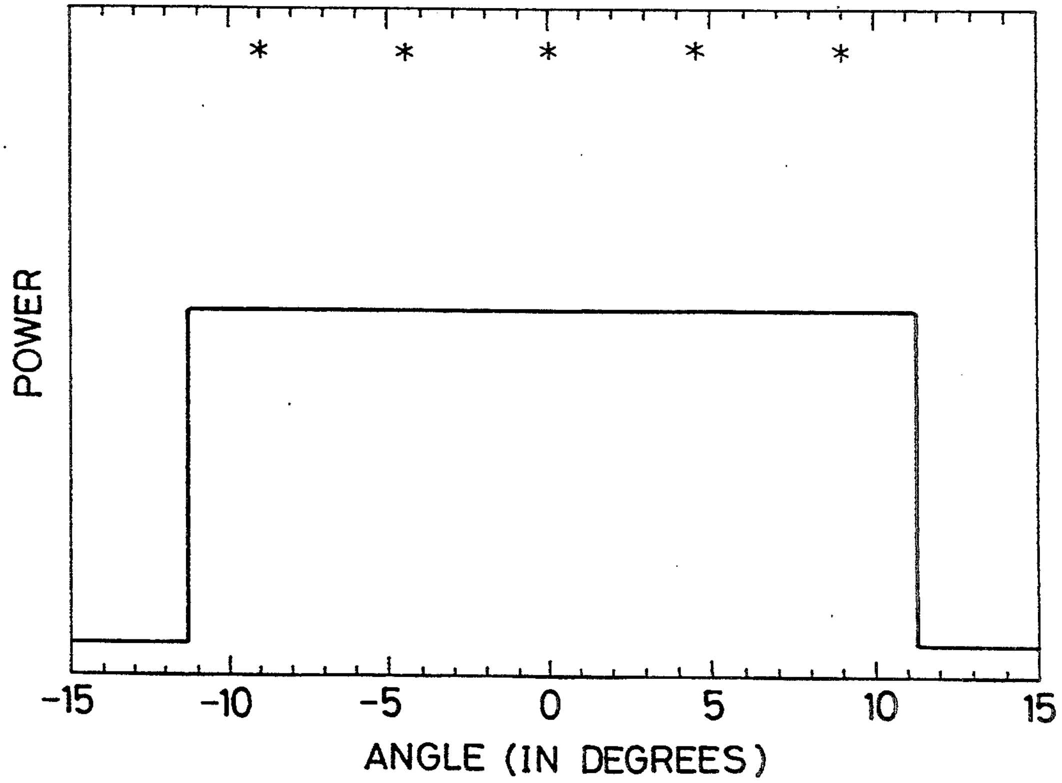
FIG.10 PRIOR ART
FIG. 10 is a schematic representation of an output power pattern obtained as a result of simulation on the conventional radar antenna system.

In the representations of the simulated power patterns shown in FIGS. 9 and 10, a "1" is output when the output power is greater than 0.1 relative to the reference value which is set to the maximum output power obtained when there is only one point scattering object, and a "0" or nothing is output in the other cases. In these representations, it is determined that a "1" is output when the output power is greater than 0.1 relative to the reference value, because of the fact that a CRT display of a radar system has a dynamic range of about 10 dB. Marks * shown in the upper portions of FIGS. 9 and 10 denote the positions of the scattering objects.

As can be seen from FIGS. 9 and 10, the method of beam compression according to the present invention can provide a final output pattern waveform which has good consistency with the distribution of scattering objects even under the conditions where the conventional beam compression method results in a final output pattern waveform which has great inconsistency with the distribution of scattering objects, which means that the present invention can provide more effective beam compression than the conventional method.

Figure 11:
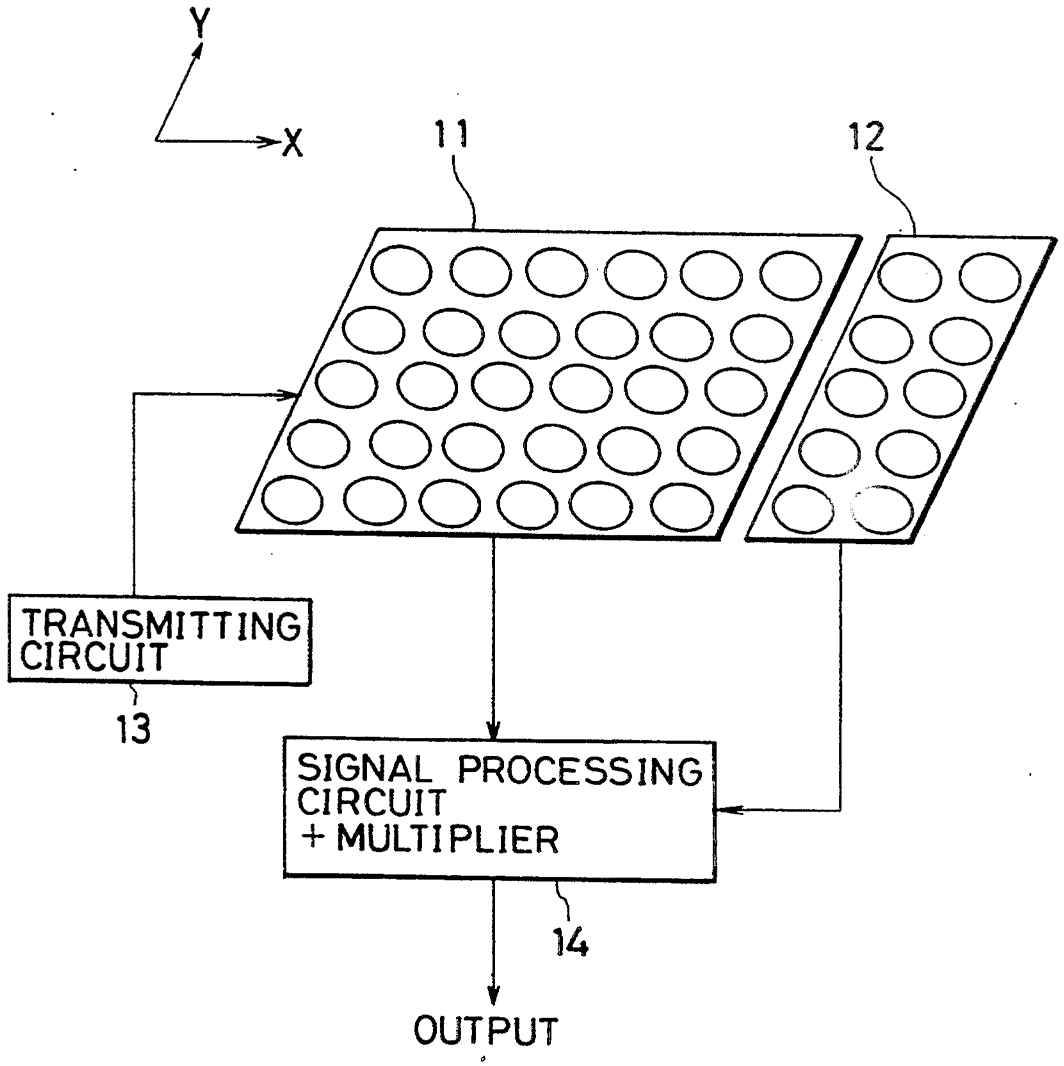
FIG. 11 is a perspective view showing a specific example of a configuration of an antenna system of the radar system shown in FIG. 8.

FIG. 11 shows a specific example of the configuration of the antenna system of the radar system shown in FIG. 8. In this example of the configuration, the antenna system is configured such that both the main antenna 11 and the sub-antenna 12 are configured with a circular patch array antenna, and such that the sub-antenna 12 is disposed apart in the X-direction from the main antenna 11.

The transmission circuit 13 may be configured in a known common manner. The signal processing circuit and the multiplying circuit 14 may be configured by using known means or techniques in such a manner that after a received electric field signals are converted to power signals, the amplitudes and the phases of the received power signals are converted to digital signals by an analog-to-digital (A/D) converter, and then the calculation of the cosine value corresponding to the phase difference, the comparison of the cosine value, and the multiplication of the power signals are carried out by a computer.

Figure 12:
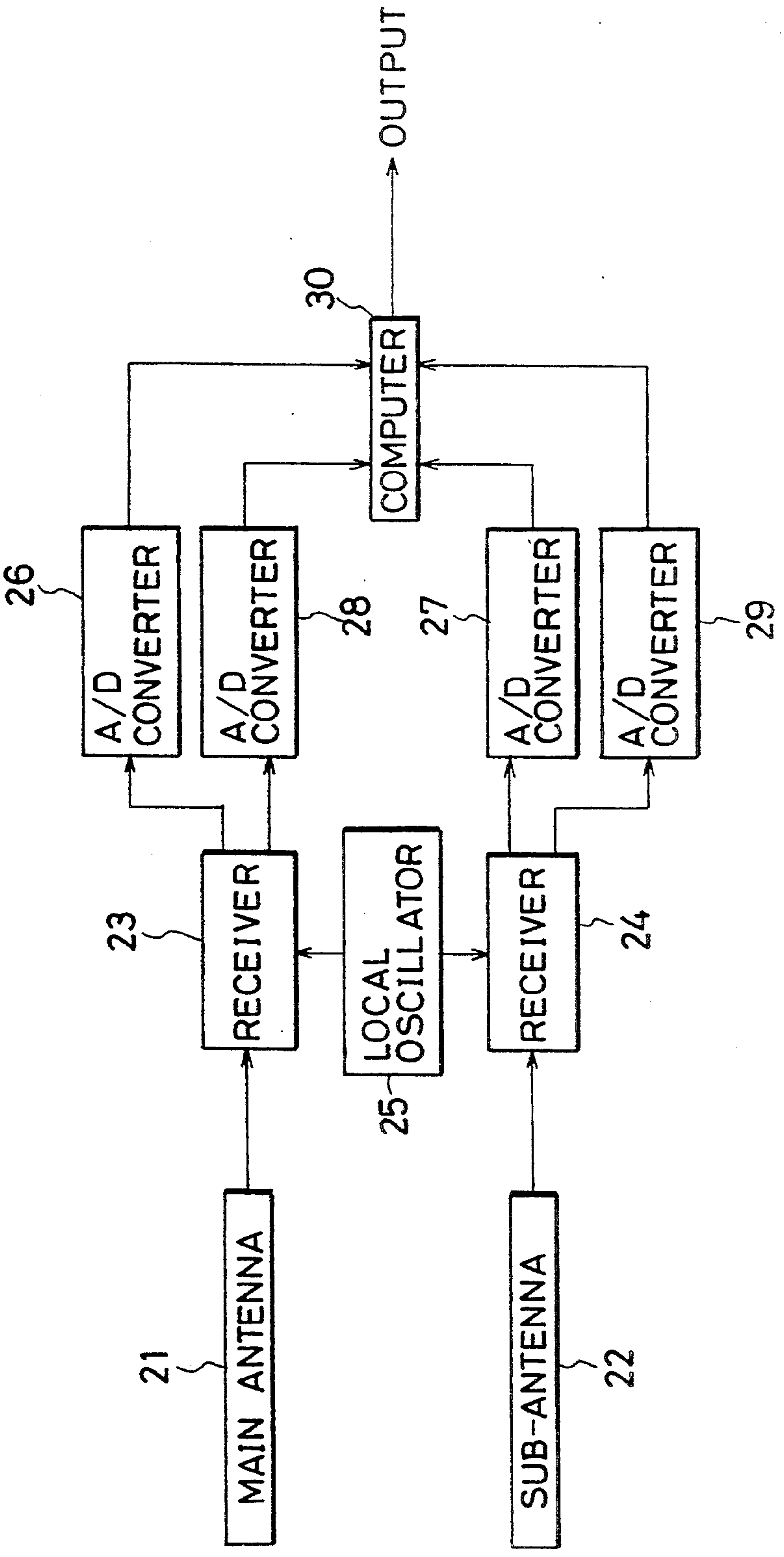
FIG. 12 is a schematic diagram showing a specific example of a configuration of a signal processing circuit and a multiplying circuit of the radar system shown in FIG. 8.

FIG. 12 shows an example of a configuration of the signal processing circuit and the multiplying circuit 14. In FIG. 12, there are shown a main antenna 21; a sub-antenna 22; receivers 23 and 24 for receiving the radio waves caught by the respective antennas 21 and 22; a local oscillator 25 for providing the same local signal to the receivers 23 and 24; analog-to-digital (A/D) converters 26 and 27 for converting the amplitudes of power given by the receivers 23 and 24 to digital signals; analog-to-digital (A/D) converters 28 and 29 for converting the phases of power given by the receivers 23 and 24 to digital signals; and a computer 30 for performing the calculation of the cosine value corresponding to the phase difference between the outputs of the analog-to-digital (A/D) converters 28 and 29, the comparison of the cosine value, and the multiplication between the outputs of the analog-to-digital (A/D) converters 26 and 27.

In the signal processing circuit and the multiplying circuit having the above-described configuration, the radio waves received by the main antenna 21 and the sub-antenna 22 are fed to the receivers 23 and 24. The same local signal is also fed by the local oscillator 25 to both receivers 23 and 24, which, in turn, output the DC signals associated with the powers and phases of the received radio waves. These outputs of the receivers 23 and 24 are fed to the analog-to-digital converters 26, 27, 28, and 29, and converted to digital values. The calculation of the cosine value corresponding to the phase difference, the comparison of the cosine value, and the multiplication are performed by the computer 30, and then the result is provided as tile final output signal.

In the above example of the configuration of the radar system, one sub-antenna is used. However, the antenna system may also comprise a plurality of sub-antennas, which may be of an arbitrary type such as dipole antenna, horn antenna, or array antenna. In the case where a plurality of sub-antennas are used, the multiplication processing can be performed by either one of the following two techniques. In the first technique, the outputs of the plurality of the sub-antennas are added together, and then the sum is multiplied by the output of the main antenna. In this case, the sub-antennas can provide a greater received power, and thus the antenna gain and the signal-to-noise ratio are improved compared to the case in which only one sub-antenna is used. In the second technique, each output of the plurality of the sub-antennas is sequentially multiplied by the output of the main antenna. In this second technique, the reduction of side lobes as well as the compression of the beam width can be achieved.

As described above referring to the embodiment, in the present invention relating to a beam compression of an antenna pattern based on the multiplicative array principle, only if the cosine value associated with the phase difference between the power signals received by the main antenna and the sub-antenna is positive, the multiplied signal is provided as an output, whereby the more effective compression of the beam width and the improvement of the resolution can be achieved.

What is claimed is:

1. A method for compressing a beam width of an antenna pattern of a radar system, comprising the steps of:

providing an antenna system having a main antenna for transmitting and receiving radio waves and at least one dedicated receiving sub-antennas which are disposed at a location adjacent to said main antenna in a direction for measuring a beam width to be compressed of said main antenna such that directions of beam axes of said sub-antennas coincide with a direction of a beam axis of said main antenna;

scanning an antenna beam of said antenna system in a direction for measuring a beam width to be compressed, and receiving by the main antenna and sub-antenna the radio waves which were transmitted by the main antenna and reflected by a scattering object and has returned;

converting respective received signals received by the main antenna and the sub-antenna to power signals;

calculating a cosine value corresponding to a phase difference between the respective received power signals; and providing a final output signal which is a signal obtained by performing multiplication between each received power signal and further multiplying a value, resulting from the multiplication, by the cosine value upon satisfaction of a condition that said cosine value is positive.

2. A method for compressing the beam width of the antenna pattern of a radar system according to claim 1, wherein said step of providing an antenna system includes a step of disposing a plurality of said sub-antennas, and wherein said step of performing the multiplication includes the steps of:

adding together the received power signals of the respective sub-antennas; and multiplying a sum of the received power signals of the sub-antennas by the received power signal of the main antenna.

3. A method for compressing the beam width of the antenna pattern of a radar system according to claim 1, wherein said step of providing an antenna system includes a step of disposing a plurality of said sub-antennas, and wherein said step of performing the multiplication includes steps of sequentially multiplying each received power signal of the sub-antennas by the received power signal of the main antenna.

4. A method for compressing the beam width of the antenna pattern of a radar system according to claim 1, wherein upon satisfaction of said condition of the cosine value being positive, said condition is a condition such that the cosine value is greater than a predetermined value which is greater than 0 and less than 1.

5. A method for compressing the beam width of the antenna pattern of a radar system according to claim 2, wherein upon satisfaction of said condition of the cosine value being positive, said condition is a condition such that the cosine value is greater than a predetermined value which is greater than 0 and less than 1.

6. A method for compressing the beam width of the antenna pattern of a radar system, according to claim 3, wherein upon satisfaction of said condition of the cosine value being positive, said condition is a condition that the cosine value is greater than a predetermined value which is greater than 0 and less than 1.

* * * * *